US009329665B2

(12) United States Patent
Ochi

(10) Patent No.: US 9,329,665 B2
(45) Date of Patent: May 3, 2016

(54) COMMUNICATION TERMINAL APPARATUS THAT TRANSITIONS FROM POWER-SAVING MODE TO ACTIVE MODE WHEN IT IS JUDGED THAT AN EMAIL NEEDS PROCESSING IN THE ACTIVE MODE

(75) Inventor: Kengo Ochi, Tokyo (JP)

(73) Assignee: Oki Data Corporation, Tokyo (JP)

(*) Notice: Subject to any disclaimer, the term of this patent is extended or adjusted under 35 U.S.C. 154(b) by 730 days.

(21) Appl. No.: 13/546,078

(22) Filed: Jul. 11, 2012

(65) Prior Publication Data

US 2013/0019116 A1 Jan. 17, 2013

(30) Foreign Application Priority Data

Jul. 12, 2011 (JP) ................. 2011-154274

(51) Int. Cl.
G06F 1/32 (2006.01)
(52) U.S. Cl.
CPC .......... *G06F 1/3284* (2013.01); *Y02B 60/1267* (2013.01); *Y02B 60/32* (2013.01)
(58) Field of Classification Search
CPC ... G06F 1/3284; G06F 1/3206; G06F 1/3209; G06F 1/3287; G06Q 10/107; H04L 51/08; H04L 51/18
USPC ........................................................ 713/300
See application file for complete search history.

(56) References Cited

U.S. PATENT DOCUMENTS

| 6,389,456 | B1* | 5/2002 | Okimoto | G06Q 10/107 709/206 |
| 7,606,837 | B2* | 10/2009 | Shields | H04L 67/1095 |
| 2002/0191211 | A1* | 12/2002 | Miller | G06F 3/1204 358/1.15 |
| 2004/0196492 | A1* | 10/2004 | Johnson | H04N 1/00209 358/1.15 |
| 2004/0255263 | A1* | 12/2004 | Ando | 717/100 |
| 2005/0120050 | A1* | 6/2005 | Myka | G06F 17/30067 |
| 2006/0259567 | A1* | 11/2006 | Jennings | 709/207 |
| 2007/0153326 | A1* | 7/2007 | Kim | 358/1.15 |
| 2007/0162582 | A1* | 7/2007 | Belali et al. | 709/223 |
| 2007/0236721 | A1* | 10/2007 | Okamoto | 358/1.14 |
| 2007/0250578 | A1* | 10/2007 | Hardy | G06Q 10/107 709/206 |
| 2009/0070759 | A1* | 3/2009 | Lee | 717/178 |
| 2011/0138210 | A1* | 6/2011 | Belali et al. | 713/323 |
| 2011/0153784 | A1* | 6/2011 | Sakata | G06F 1/3203 709/219 |
| 2011/0292446 | A1* | 12/2011 | Kojima | 358/1.15 |
| 2011/0295978 | A1* | 12/2011 | Pazos | H04H 20/426 709/219 |
| 2013/0308165 | A1* | 11/2013 | Venkatesh | G06F 3/1205 358/1.15 |

FOREIGN PATENT DOCUMENTS

| EP | 2393273 A | 12/2011 |
| JP | 2005-234936 A | 9/2005 |
| JP | 2011-254205 A | 12/2011 |

* cited by examiner

Primary Examiner — Thomas Lee
Assistant Examiner — Danny Chan
(74) Attorney, Agent, or Firm — Mots Law, PLLC

(57) ABSTRACT

A communication apparatus includes: an email-information acquisition unit configured to acquire information on an email, received by a mail server, from the mail server in a power-saving mode; a judgment unit configured to judge whether there is an email that needs processing in a normal active mode on the basis of the information acquired by the email-information acquisition unit; a power-saving mode cancelling unit configured to carry out the transition from the power-saving mode to the active mode when the judgment unit judges that the mail server has an email that needs processing in the active mode; and an email acquisition unit configured to acquire an email, received by the mail server, from the mail server in the active mode.

18 Claims, 18 Drawing Sheets

FIG.7

| | 511 | 512 | 513 | 514 | 515 |
|---|---|---|---|---|---|
| | MAIL SERVER | PORT NUMBER | USER NAME | PASSWORD | RECEPTION INTERVAL |
| RECEIVE | mail.example.com | 143 | printer | passwd | 10 MINUTES |

FIG.8

```
        Date: Tue,1 Apr 2008 12:34:56 +0900
521 ──▶ From: pc@example.com
522 ──▶ To: printer@example.com
        Cc:
        Reply-To: pc@example.com
        Messsage-ID: <00000301@example.com>
        Subject: image
        Mime-Version:1.0
        Content-Type: multipart/mixed; boundary="abcdfwefjsdvsdfg"

──abcdfwefjsdvsdfg
        Content-Type:text/plain; charset=us-ascii

================================================================
        Please Open the attached document.

Resolution: 150 dpi
        Color Mode: Color
        Document Size: A4
        Attachment File Format:PDF ──abcdfwefjsdvsdfg
        Content-Type: application/octet-stream;name="image.pdf"
        Content-Transfer-Encoding: base64
523 ──▶ Content-Disposition: attachment; filename="image.pdf"

JVBERi0xLjMNCjggMCB
        (OMITTED)
        emUgMTAgPj4NCnN0YXJ0eHJlZg0KNDE1NzINCiUlRU9GDQo
        ──abcdfwefjsdvsdfg
```

FIG.9

```
        Date: Tue,1 Apr 2008 12:34:56 +0900
521 ──➤ From: pc@example.com
522 ──➤ To: printer@example.com
        Cc:
        Reply-To: pc@example.com
        Messsage-ID: <00000301@example.com>
        Subject: image
        Mime-Version: 1.0
        Content-Type: multipart/mixed; boundary="abcdfwefjsdvsdfg"

──abcdfwefjsdvsdfg
        Content-Type: text/plain; charset=us-ascii

================================================================

=
        Please Open the attached document.

Resolution: 150 dpi
        Color Mode: Color
        Document Size: A4
        Attachment File Format: JPEG ──abcdfwefjsdvsdfg
        Content-Type: application/octet-stream; name="image.jpeg"
        Content-Transfer-Encoding: base64
523 ──➤ Content-Disposition: attachment;filename="image.jpeg"

JVBERi0xLjMNCjggMCB
        (OMITTED)
        CnN0YXJ0eHJIZg0KNDE1NzINCiUIRU9GDQo=
        ──abcdfwefjsdvsdfg
```

FIG.11

```
        Date: Tue,1 Apr 2008 12:34:56 +0900
521 ──▶ From: pc@example.com
522 ──▶ To: printer@example.com
        Cc:
        Reply-To: pc@example.com
        Messsage-ID: <00000303@example.com>
        Subject: test mail
        Mime-Version: 1.0
        Content-Type: text/plain; charset=us-ascii This message is test.
```

FIG.14

|  | ATTACHED-FILE EXTENSION (501) | MAXIMUM EMAIL SIZE (502) | PRIORITY (503) |
|---|---|---|---|
| CONDITION | pdf | 10MB | 1 |

FIG.15

```
              Date: Tue,1 Apr 2008 12:34:56 +0900
531 ──→ From: pc@example.com
532 ──→ To: printer@example.com
              Cc:
              Reply-To: pc@example.com
              Messsage-ID: <00000301@example.com>
              Subject: image
              Mime-Version: 1.0
              Content-Type: multipart/mixed; boundary="abcdfwefjsdvsdfg"
534 ──→ X-Priority:1

——abcdfwefjsdvsdfg
              Content-Type: text/plain; charset=us-ascii
              ================================================================
              Please Open the attached document.

Resolution: 150 dpi
              Color Mode: Color
              Document Size: A4
              Attachment File Format: PDF ——abcdfwefjsdvsdfg
              Content-Type: application/octet-stream; name="image.pdf"
              Content-Transfer-Encoding: base64
533 ──→ Content-Disposition: attachment;filename="image.pdf"

JVBERi0xLjMNCjggMCB
              (OMITTED)
              emUgMTAgPj4NCnN0YXJ0eHJIZg0KNDE1NzINCiUIRU9GDQo=
              ——abcdfwefjsdvsdfg
```

FIG.16

```
        Date: Tue,1 Apr 2008 12:34:56 +0900
531 ──→ From: pc@example.com
532 ──→ To: printer@example.com
        Cc:
        Reply-To: pc@example.com
        Messsage-ID: <00000301@example.com>
        Subject: image
        Mime-Version: 1.0
        Content-Type: multipart/mixed; boundary="abcdfwefjsdvsdfg"
534 ──→ X-Priority:3

——abcdfwefjsdvsdfg
        Content-Type: text/plain; charset=us-ascii

================================================================
        =
        Please Open the attached document.

Resolution: 150 dpi
        Color Mode: Color
        Document Size: A4
        Attachment File Format: JPEG ——abcdfwefjsdvsdfg
        Content-Type: application/octet-stream; name="image2.pdf"
        Content-Transfer-Encoding: base64
533 ──→ Content-Disposition: attachment;filename="image2.pdf"

JVBERi0xLjMNCjggMCB
        (OMITTED)
        emUgMTAgPj4NCnN0YXJ0eHJlZg0KNDE1NzINCiUlRU9GDQo=
        ——abcdfwefjsdvsdfg
```

COMMUNICATION TERMINAL APPARATUS THAT TRANSITIONS FROM POWER-SAVING MODE TO ACTIVE MODE WHEN IT IS JUDGED THAT AN EMAIL NEEDS PROCESSING IN THE ACTIVE MODE

CROSS REFERENCE TO RELATED APPLICATIONS

This application claims priority based on 35 USC 119 from prior Japanese Patent Application No. 2011-154274 filed on Jul. 12, 2011, entitled "COMMUNICATION TERMINAL APPARATUS", the entire contents of which are incorporated herein by reference.

BACKGROUND OF THE INVENTION

1. Field of the Invention

The invention relates to a communication terminal apparatus configured to process received image data.

2. Description of Related Art

A conventional communication terminal apparatus has an energy-saving function of switching between a normal active mode and a power-saving mode lower in power consumption than in the normal active mode. When a predetermined factor to return from the power-saving mode occurs in the power-saving mode, the communication terminal apparatus returns to the normal active mode, then performs a processing corresponding to the factor, and receives an email from a mail server (see, for example, Patent Document 1: Japanese Patent Application Publication No. 2005-234936, paragraphs [0015] to [0018] and FIG. 1).

SUMMARY OF THE INVENTION

The conventional technique, however, has a problem of still consuming a large amount of power for the processing of emails.

An object of an embodiment of the invention is to sufficiently reduce the power consumption.

An aspect of the invention is a communication apparatus capable of communicating with a mail server and having a normal active mode and a power-saving mode that is lower in power consumption than the active mode. The communication apparatus includes: an email-information acquisition unit configured to acquire information on an email, received by the mail server, from the mail server in the power-saving mode; a judgment unit configured to judge whether there is an email that needs processing in the active mode, on the basis of the information acquired by the email-information acquisition unit; a power-saving mode cancelling unit configured to carry out the transition from the power-saving mode to the active mode when the judgment unit judges that the mail server has an email that needs processing in the active mode; and an email acquisition unit configured to acquire an email, received by the mail server, from the mail server in the active mode.

According to this aspect, the power consumption can be sufficiently reduced.

BRIEF DESCRIPTION OF THE DRAWINGS

FIG. 7 is an explanatory diagram illustrating various settings for connecting to a mail server according to the first embodiment.

FIG. 8 is an explanatory diagram illustrating an email to a printer according to the first embodiment.

FIG. 9 is an explanatory diagram illustrating another email to the printer according to the first embodiment.

FIG. 11 is an explanatory diagram illustrating still another email to the printer according to the first embodiment.

FIG. 14 is an explanatory diagram illustrating the email printing conditions according to a second embodiment.

FIG. 15 is an explanatory diagram illustrating an email to be sent to the printer according to the second embodiment.

FIG. 16 is an explanatory diagram illustrating another email sent to be to the printer according to the second embodiment.

DETAILED DESCRIPTION OF EMBODIMENTS

Figure 1:
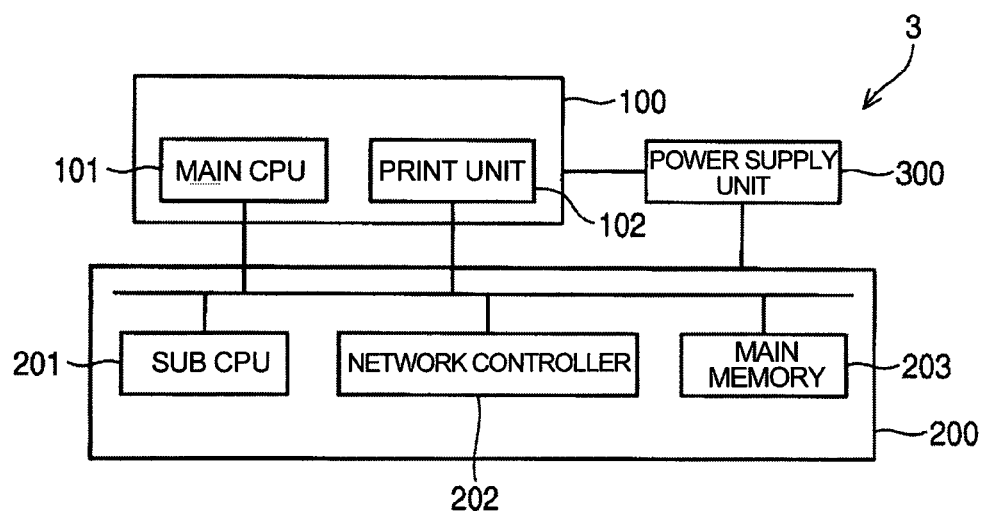
FIG. 1 is a block diagram illustrating a configuration of a communication terminal apparatus according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Figure 2:
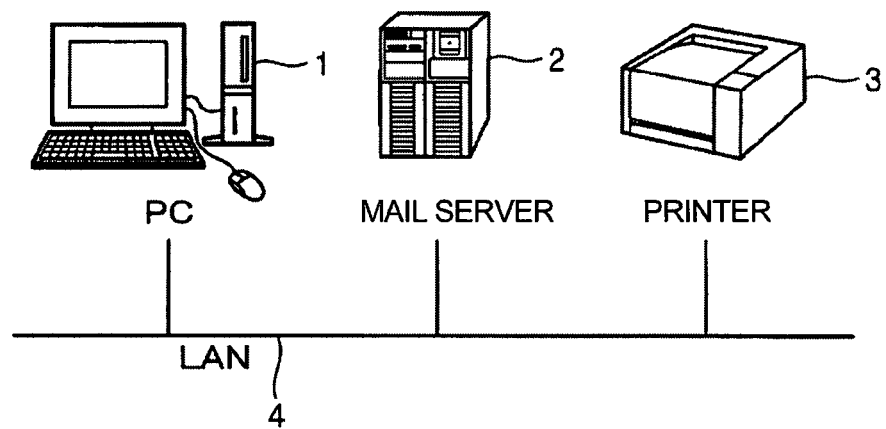
FIG. 2 is an explanatory diagram illustrating a network topology of the communication terminal apparatus according to the first embodiment.

FIG. 2 is an explanatory diagram illustrating a network topology of a communication terminal apparatus as a communication apparatus according to a first embodiment. In FIG. 2, personal computer (PC) 1, mail server 2, and printer 3 are communicably connected to local area network (LAN) 4 serving as a communication line. PC 1 is a computer serving as a host device. PC 1 communicates with mail server 2 via LAN 4, and thus can send and receive electronic mails (hereinafter referred to as "email").

Mail server 2 stores emails received from PC 1 or the like in a storage unit. At the request of printer 3 or the like, mail server 2 retrieves an email stored in the storage unit, and sends the email to the requestor. In addition, at the request of printer 3 or the like, mail server 2 sends information on an email stored in the storage unit.

Printer 3 is a communication terminal apparatus having a print function and configured to receive emails from mail server 2 connected to LAN 4, and switch between a normal active mode and a power-saving mode that is lower in power consumption than the normal active mode. A unique email address (specifically, "printer@example.com" in this embodiment) is given to printer 3. Printer 3 is set to be capable of receiving emails from PC 1 or the like via mail server 2, and is configured to print a file attached to a received email. Note that printer 3 cannot print some files attached to the emails due to their formats. In this embodiment, printer 3 is the communication terminal apparatus to which the invention is applied.

FIG. 1 is a block diagram illustrating a configuration of the communication terminal apparatus according to the first embodiment, and specifically illustrating the configuration of printer 3 shown in FIG. 2. As show in FIG. 1, printer 3 includes main unit 100, sub unit 200, and power supply unit 300.

Main unit 100 includes main CPU 101 and print portion 102 (print engine) as a process unit, and includes portions to which no power is supplied in the power-saving mode. Accordingly, main unit 100 can be operated not in the power-saving mode but in the active mode. The power-saving mode mentioned above is a mode where the supply of power to main unit 100 is stopped so that power is supplied only to sub unit 200, and thus is lower in power consumption than the active mode where power is supplied both to main unit 100 and to sub unit 200.

Main CPU 101 serving as a main controller controls the overall operations of printer 3 on the basis of a control program, which is to be described later. Print portion 102 serving as a print engine prints image data processed by main CPU 101, and also prints print data received by main unit 100 from network controller 202 (i.e., a file attached to an email), which is to be described later.

Sub unit 200 includes sub CPU 201 serving as a sub controller, network controller 202, and main memory 203, and includes portions to which power is supplied in the power-saving mode. Accordingly, subunit 200 can be operated in both active mode and power-saving mode. In the power-saving mode, sub CPU 201 queries mail server 2, shown in FIG. 2, via network controller 202 at predetermined time intervals, and thereby monitors whether there is an email addressed to printer 3. Sub CPU 201 also performs switching control to make power supply unit 300 supply or not supply power to main unit 100.

Network controller 202, serving as an email acquisition unit and an email-information acquisition unit, communicates with external devices via LAN 4 shown in FIG. 2 when a control program is executed by CPU 101 or sub CPU 201. Network controller 202 thus controls the reception of an email, information on an email, and the like from mail server 2. Network controller 202 is capable of acquiring information on email from mail server 2 in the power-saving mode. Main memory 203 is a storage unit that includes a memory and the like accessible from main CPU 101 and sub CPU 201. Main memory 203 stores control programs that are executed by main CPU 101 and sub CPU 201, and further provides a memory area necessary for the execution of the control programs.

Power supply unit 300 is supplied with power from an external source, and in turn supplies power to sub unit 200 and, when instructed by sub unit 200, also supplies power to main unit 100. Accordingly, the power-saving mode is a mode where power is supplied only to sub unit 200 whereas the active mode is a mode where power is supplied not only to sub unit 200 but also to main unit 100.

Sub CPU 201 of sub unit 200 configured as described above serves as a judgment unit configured to judge, in the power-saving mode, whether there is an email that needs processing in the active mode, on the basis of the information acquired by network controller 202. Sub CPU 201 also serves as a power-saving-mode cancelling unit configured to carry out the transition from the power-saving mode to the active mode. If sub CPU 201 serving as the judgment unit judges that mail server 2 has an email that needs processing in the active mode, sub CPU 201, serving as the power-saving-mode cancelling unit, carries out the transition from the power-saving mode to the active mode so that the email can be received by network controller 202 and processed by print portion 102.

In this embodiment, a condition for the transition from the active mode to the power-saving mode is as follows. For example, the transition is made when there is no manipulation by the user or no print instruction from the host device for a predetermined period. Conditions for the transition from the power-saving mode to the active mode are as follows. For example, the transition is made when, during the power-saving mode, there is a manipulation by the user or a print instruction from a host device, and mail server 2 shown in FIG. 2 receives an email addressed to printer 3 and attached with a printable file.

Figure 3:
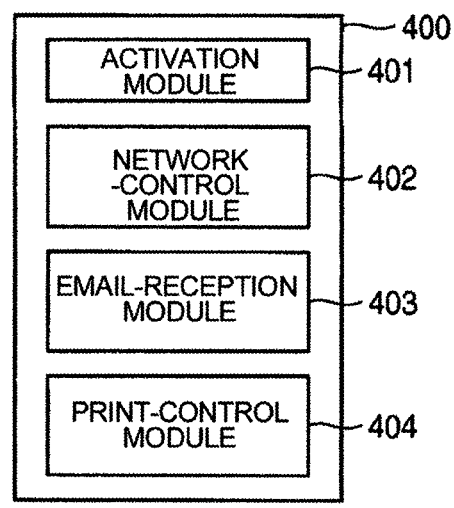
FIG. 3 is a block diagram illustrating a configuration of a control program according to the first embodiment.

FIG. 3 is a block diagram illustrating a configuration of a control program according to the first embodiment. As shown in FIG. 3, control program 400 includes activation module 401, network-control module 402, email-reception module 403, and print-control module 404. Control program 400 is software to control the overall operations of printer 3. Control program 400 is stored in main memory 203 of printer 3 shown in FIG. 1, and is executed by main CPU 101 and sub CPU 201.

Activation module 401 executes processing necessary in the transition from the power-saving mode to the active mode, such as the loading of programs to be executed in the active mode and the initialization of main memory 203. Network-control module 402 controls network controller 202 shown in FIG. 1, and controls communications with external apparatuses via LAN 4 shown in FIG. 2. In addition, network-control module 402 includes set-up information (hereinafter, referred to as "mail-server-connection set-up information") that is used to connect printer 3 to mail server 2 via LAN 4 shown in FIG. 2.

Mail-server-connection set-up information contains information on various conditions for printer 3 to be connected to mail server 2. For example, as shown in FIG. 7, Mail server 511 stores therein "mail.example.com" as the host name of mail server 2. Port number 512 stores therein "143" as the number corresponding to the TCP (transmission control protocol) port for connecting to mail server 2. User name 513 stores therein "printer" as the user name needed to log into mail server 2. Password 514 stores therein "passwd" as the password needed to log into mail server 2. Reception intervals 515 stores therein "10 minutes" as each of the time intervals at which printer 3 is connected to mail server 2.

Email-reception module 403 controls network controller 202 shown in FIG. 1, and controls the reception of an email from external devices via LAN 4 shown in FIG. 2. Furthermore, email-reception module 403 contains print-condition information as a condition for printing an email received from mail server 2 via LAN 4 shown in FIG. 2.

Figure 6:
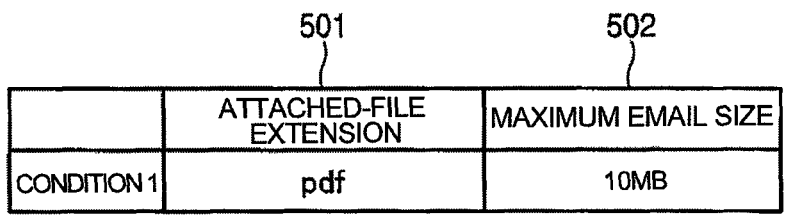
FIG. 6 is an explanatory diagram illustrating email printing conditions according to the first embodiment.

In the email print-condition information, various conditions are set for printer 3 to print an email received from mail server 2. For example, as shown in FIG. 6, attached-file extension 501 stores therein "pdf" (portable document format) as the extension of the printable file attached to an email. Maximum email size 502 stores therein "10 MB" (megabytes) as the maximum size (volume) of the printable file attached to an email. In this embodiment, maximum email size 502 stores therein the maximum value of the size of an attached file that can be received from mail server 2 at a single transfer. Print-control module 404 controls print portion 102, and thereby prints, on a print medium, the print data received by network-control module 402 or email-reception module 403.

Control program 400 configured as described above performs a control such that an email is received through a connection to mail server 2 in accordance with the mail-server-connection set-up information, and the file attached to the email is printed on a print medium in accordance with the email print-condition information. When main CPU 101 and sub CPU 201 shown in FIG. 2 execute control program 400, printer 3 prints, on a print medium, the file attached to the email received from mail server 2.

Note that in the earlier description, printer 3 shown in FIG. 2 is connected to LAN 4, but printer 3 may be connected to other types of communication lines allowing PC 1, mail server 2, and printer 3 to be communicably connected to one another. Note also that the email printing conditions shown in FIG. 6 are not limited to the extension of a file attached to an email and the maximum size of the attached file. Various other kinds of information on an email, such as the sender of the email and the subject of the email, can also be used as the condition.

Figure 4:
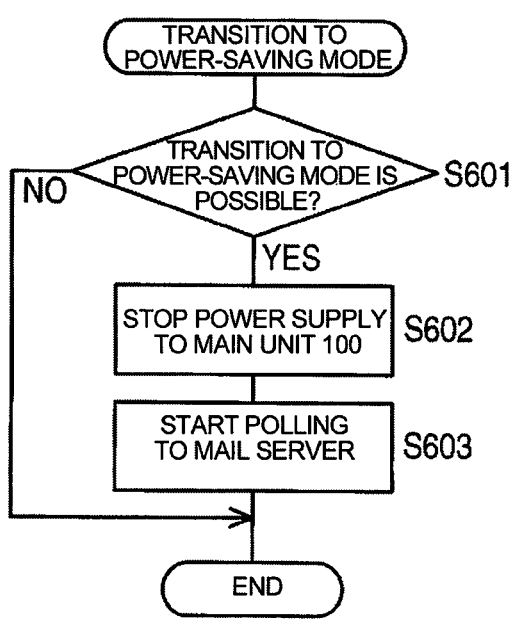
FIG. 4 is a flowchart illustrating a flow of operations to transition to a power-saving mode according to the first embodiment.

Now, a description is given of operations of the configuration described above. In this embodiment, the description is given of the operations in a case where the printer is in the power-saving mode and two emails addressed to the printer are received by the mail server. First of all, the processing performed when the printer transitions to the power-saving mode is described below by referring to FIG. 1 and by following the steps denoted by numbers headed by an S in the flowchart of FIG. 4, which illustrates the flow of the processing to transition to the power-saving mode according to the first embodiment.

S601: If a condition for the transition to the power-saving mode is satisfied, e.g., there is no manipulation by the user or no print instruction from the host device for a predetermined period, main CPU 101 of printer 3 in the active mode judges whether the transition to the power-saving mode is possible or not, e.g., whether data is being processed or not. If main CPU 101 judges that the transition is possible, the processing moves to step S602. If main CPU 101 judges that the transition is impossible, the processing is terminated.

S602: After judging that the transition to the power-saving mode is possible, main CPU 101 instructs sub CPU 201 to carry out the transition to the power-saving mode. Upon receiving the instruction, sub CPU 201 instructs power supply unit 300 to stop the supply of power to main unit 100. Upon receiving the instruction to stop the supply of power, power supply unit 300 stops the supply of power to main unit 100.

Figure 5:
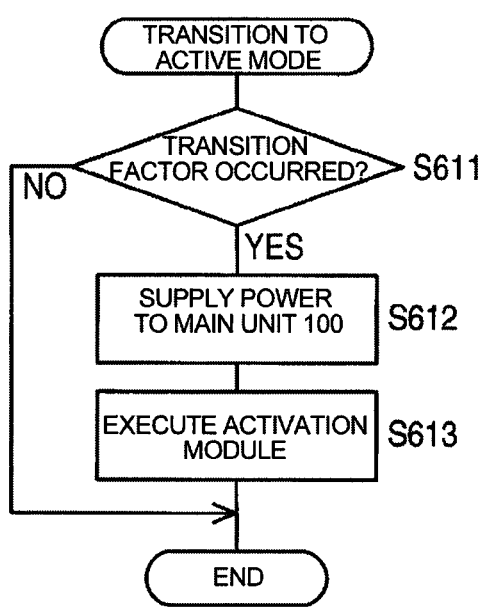
FIG. 5 is a flowchart illustrating a flow of operations to transit to a normal active mode according to the first embodiment.

S603: After the transition to the power-saving mode, sub CPU 201 starts the polling to monitor mail server 2 via network controller 202 at reception intervals 515 in the mail-server-connection set-up information shown in FIG. 7, and the processing is terminated. Next, the processing performed for the printer to transition from the power-saving mode to the active mode is described below by referring to FIG. 1 and by following the steps denoted by numbers headed by an S in the flowchart of FIG. 5, which illustrates the flow of the processing to transition to the active mode according to the first embodiment.

S611: Sub CPU 201 of printer 3 in the power-saving mode monitors mail server 2 via network controller 202 at reception intervals 515 in the mail-server-connection set-up information shown in FIG. 7 to judge whether mail server 2 has received an email attached with a printable file, that is, whether a factor to transition from the power-saving mode to the active mode has occurred. If sub CPU 201 judges that there has occurred a factor to transition from the power-saving mode to the active mode, the processing moves to step S612. If sub CPU 201 judges that there has occurred no such factor to transition from the power-saving mode to the active mode, the processing for the transition is terminated.

S612: After judging that there has occurred a factor to transition from the power-saving mode to the active mode, sub CPU 201 instructs power supply unit 300 to start supplying the power to main unit 100. Upon receiving the instruction, power supply unit 300 starts supplying power to main unit 100.

S613: Main CPU 101, activated by being supplied with power, executes activation module 401 of control program 400 shown in FIG. 3 stored in main memory 203 to transition to the active mode, and then the processing for the transition is terminated.

Next, the content of the two emails received by the printer in this embodiment is described below by referring to FIG. 2. The description is given on the basis of explanatory diagrams shown in FIG. 8 and FIG. 9 illustrating the emails addressed to the printer according to the first embodiment. Note that FIG. 8 shows the content of a first email and FIG. 9 shows the content of a second email.

In FIG. 8, sender 521 is the email address of PC 1 "pc@example.com." Destination 522 is the email address of printer 3 "printer@example.com." Name of attached file 523 indicates that the name of the attached file is "image.pdf," meaning that the email is attached with a file of the PDF format. Note that some part of image data of the PDF-format file is omitted from the diagram shown in FIG. 8.

In FIG. 9, sender 521 is the email address of PC 1 "pc@example.com." Destination 522 is the email address of printer 3 "printer@example.com." Name of attached file 523 indicates that the name of the attached file is "image.jpeg," meaning that the email is attached with a file of the JPEG (joint photographic experts group) format. Note that some part of the image data is omitted from the image data of the JPEG-format file from the diagram shown in FIG. 9.

Next, by referring to FIGS. 1 and 2, a description is given of the communication sequence performed between the printer and the mail server when the printer in the power-saving mode receives an email from the mail server. The description is given by following the steps denoted by numbers headed with an S in the sequence chart shown in FIG. 10, which illustrates the flow of the email-reception processing according to the first embodiment. In this embodiment, the communication protocol between the printer and the mail server is IMAP (Internet Message Access Protocol).

S51: Network controller 202 of printer 3 in the power-saving mode is connected to TCP 143 port of mail server 2 (host name: "mail.example.com") in accordance with the mail-server-connection set-up information stored in network-control module 402 shown in FIG. 3.

S52: After printer 3 is connected to mail server 2, mail server 2 sends, to printer 3, a reply "*OK IMAP4ver1 server ready."

S53: Printer 3 sends, to mail server 2 via network controller 202, an "A100 LOGIN printer passwd" command using the user name and the password stored in mail-server-connection set-up information of network-control module 402 shown in FIG. 3. Thus, printer 3 attempts to log into mail server 2.

S54: Mail server 2 verifies the user name and the password received from printer 3. If the user name and the password put together form a correct combination, mail server 2 allows printer 3 to log into mail server 2. As a response to the logging in, mail server 2 sends "A100 OK LOGIN completed" to printer 3.

S55: After successfully logging into mail server 2, printer 3 sends, via network controller 202, an "A102 SELECT~/Mail/Inbox" command to mail server 2 to query whether mail server 2 has an email addressed to printer 3.

S56: Upon receiving the query from printer 3, mail server 2 replies by sending email information on the email box "~/Mail/Inbox" addressed to printer 3. In this embodiment, the reply contains the fact that the email box has two emails ("*2 EXISTS") and both of the two emails are unread ("*2 RECENT").

S57: Printer 3 sends an "A104 SEARCH SMALLER 10485760" command to mail server 2 via network controller 202, and thereby searches for emails each with a size that is not larger than 10 MB (10485760 bytes).

S58: Mail server 2 replies by sending, to printer 3, the result of searching for the emails that satisfy the conditions set forth by the query of printer 3. In this embodiment, information on emails 1 and 2 ("*SEARCH 1:2") is sent to printer 3.

S59: Then, to acquire information on the name of the file attached to email 1 of the emails each with a size that is not larger than 10 MB, printer 3 sends, via network controller 202, a command that requests the value of the "content-disposition" in the email header.

S60: mail server 2 replies that the name of the file attached to email 1 is "image.pdf."

S61: Then, to acquire information on the name of the file attached to email 2, printer 3 sends, via network controller 202, a command that requests the value of the "content-disposition" in the email header.

S62: Mail server 2 replies that the name of the file attached to email 2 is "image.jpeg."

S63: On the basis of the email printing condition information stored in email-reception module 403 shown in FIG. 3, sub CPU 201 of printer 3 judges that it is possible to receive an email having a size of not larger than 10 MB and attached with a file of the PDF format. Specifically, in this embodiment, sub CPU 201 judges that the file attached to email 1 is printable. Then, sub CPU 201 executes the transition processing shown in FIG. 5, and makes printer 3 transition from the power-saving mode to the active mode.

In this way, on the basis of some of the information acquired by network controller 202 serving as the email-information acquisition unit, sub CPU 201 serving as a judgment unit judges whether there is an email that needs processing in the active mode. Specifically, the information used in the judgment is the information indicating whether there is a file attached to an email, the information on the format of the attached file, and the information on the size of the attached file.

After the transition from the power-saving mode to the active mode, printer 3 sends, an "A110 FETCH 1 rfc822" command to mail server 2 via network controller 202, and thereby requests mail server 2 to send email 1.

S64: Upon receiving the request for sending email 1, mail server 2 sends email 1 to printer 3.

S65: Upon receiving email 1, printer 3 sends an "A112 STORE 1:2 FLAGS (\Deleted)" command to mail server 2 via network controller 202. This command is a request for deletion of email 1 that has already been received by printer 3 and for deletion of email 2 that is not receivable. Note that email 2 is deleted so as not to allow unreceivable email 2 to remain in mail server 2.

S66: Upon receiving the request for deletion of emails 1 and 2, mail server 2 deletes emails 1 and 2 from the email box, and sends the result to printer 3.

S67: Having acquired necessary information from mail server 2, printer 3 sends an "A114 LOGOUT" command requesting the log out from mail server 2 to mail server 2 via network controller 202.

S68: Upon receiving the request for log out sent by printer 3, mail server 2 sends a reply of log-out massage to printer 3.

S69: When the log out from mail server 2 is completed, printer 3 cuts off the TCP connection having been established with mail server 2 via network controller 202.

Next, a description is given of the operations for the case where even if the mail server receives an email addressed to the printer, the printer continues to be in the power-saving mode instead of transitioning from the power-saving mode to the active mode. First of all, one email received by the printer is described by referring to the explanatory diagram of FIG. 11 illustrating the email addressed to the printer according to the first embodiment.

FIG. 11 shows that sender 521 is the email address of PC 1 "pc@example.com," and destination 522 is the email address of printer 3 "printer@example.com." The email shown in FIG. 11 has no name of any attached file, meaning that the email does not have any attached file but has only the message body.

Figure 12:
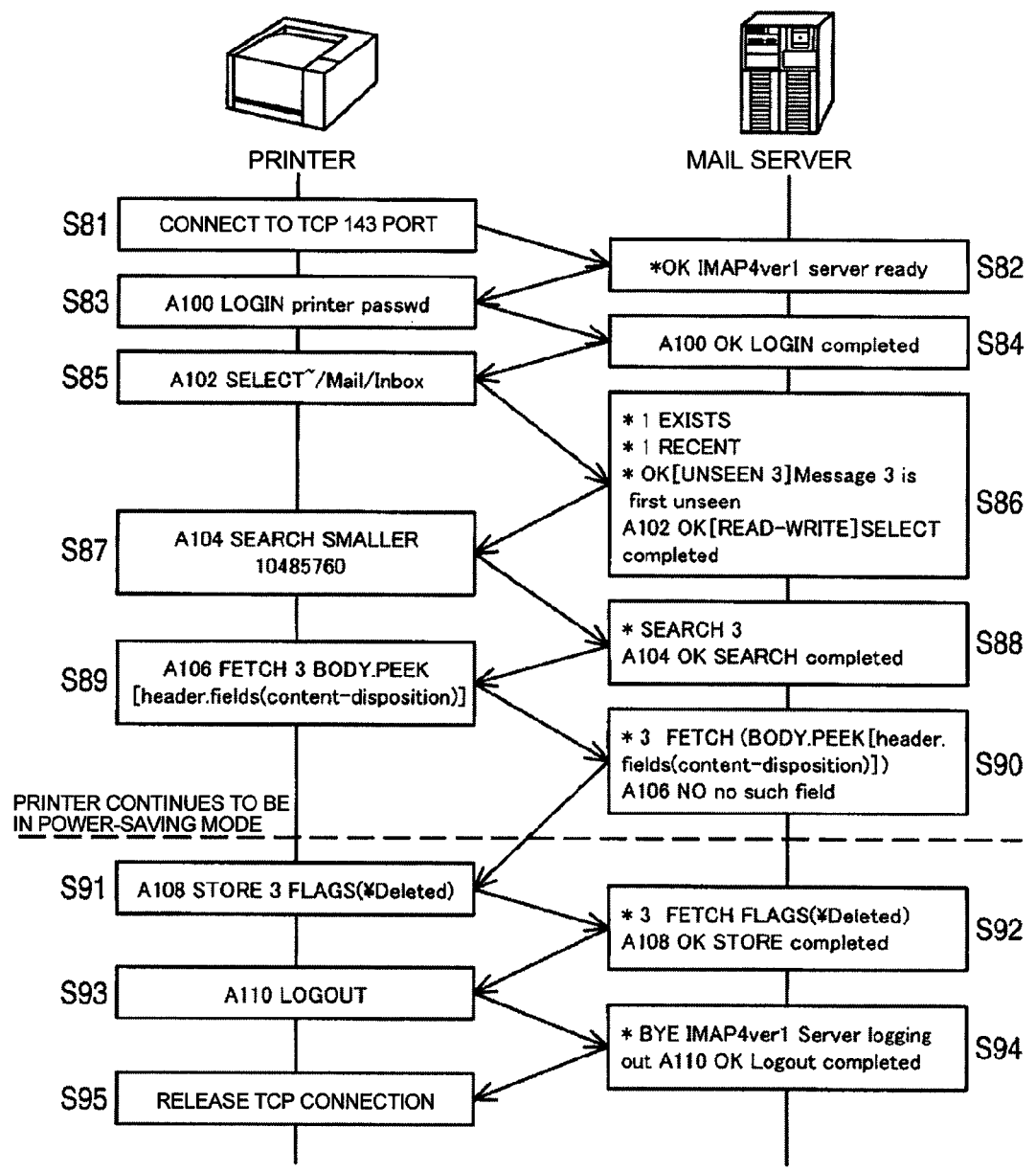
FIG. 12 a sequence chart illustrating the flow of email-reception processing according to the first embodiment.

Next, the communication sequence between the printer and the mail server for the case where the mail server receives the email with no attached file shown in FIG. 11 is described by referring to FIGS. 1 and 2. The description is given by following steps denoted by numbers headed with an S in the sequence chart of FIG. 12 illustrating the flow of email-reception processing according to the first embodiment. Note that the description in this embodiment assumes that the communication protocol used between the printer and the mail server is IMAP.

Figure 10:
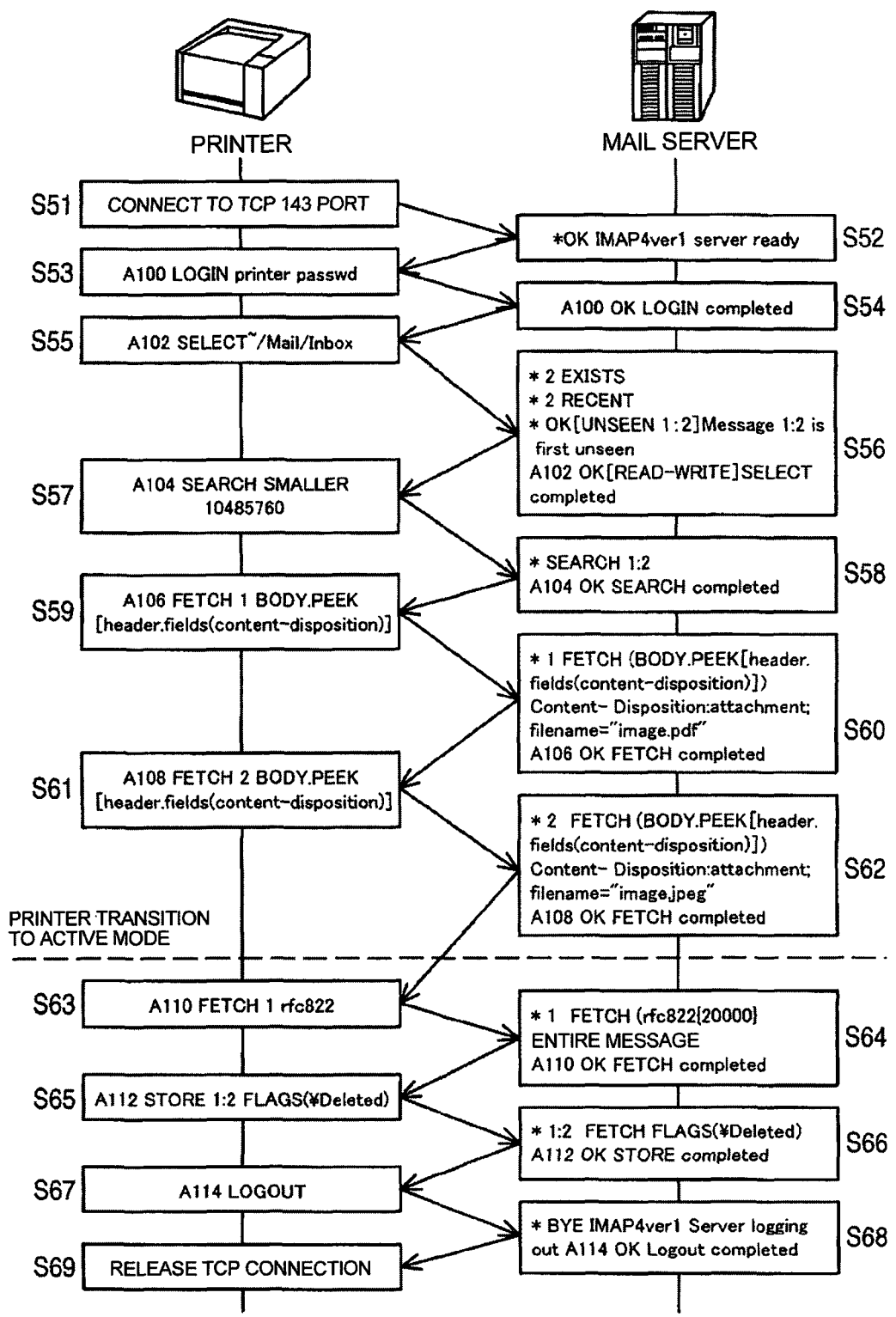
FIG. 10 is a sequence chart illustrating the flow of email-reception processing according to the first embodiment.

S81 to S85: Similar processes to those at steps S51 to S55 in FIG. 10 are performed. So no description is given of these steps.

S86: Upon receiving the query from printer 3, mail server 2 replies by sending email information on the email box "~/Mail/Inbox" addressed to printer 3. In this embodiment, the reply contains the fact that the email box has one email ("*1 EXISTS") and the email is unread ("*1 RECENT").

S87: Printer 3 sends an "A104 SEARCH SMALLER 10485760" command to mail server 2 via network controller 202, and thereby searches for emails each with a size that is not larger than 10 MB (10485760 bytes).

S88: Mail server 2 replies by sending, to printer 3, the result of searching for the email that satisfies the conditions set forth by the query of printer 3. In this embodiment, information on email 3 ("*SEARCH 3") is sent to printer 3.

S89: Then, to acquire information on the name of the file attached to email 3 of the emails each with a size that is not larger than 10 MB, printer 3 sends, via network controller 202, a command that requests the value of the "content-disposition" in the email header.

S90: Mail server 2 replies that there is no file attached to email 3. Then, since there is no email that needs processing, printer 3 continues to be in the power-saving mode.

S91: Printer 3 sends an "A108 STORE 3 FLAGS (\Deleted)" command as a request for deletion of unreceivable email 3 to mail server 2 via network controller 202.

S92: Upon receiving the request for the deletion of email 3, mail server 2 deletes email 3 from the email box, and sends the result to printer 3.

S93: Having acquired necessary information from mail server 2, printer 3 sends an "A110 LOGOUT" command requesting the log out from mail server 2, to mail server 2 via network controller 202.

S94: Upon receiving the log out request from printer 3, mail server 2 sends a reply of log-out massage to printer 3.

S95: When the log out from mail server 2 is completed, printer 3 releases the TCP connection having been established with mail server 2 via network controller 202.

Figure 13:
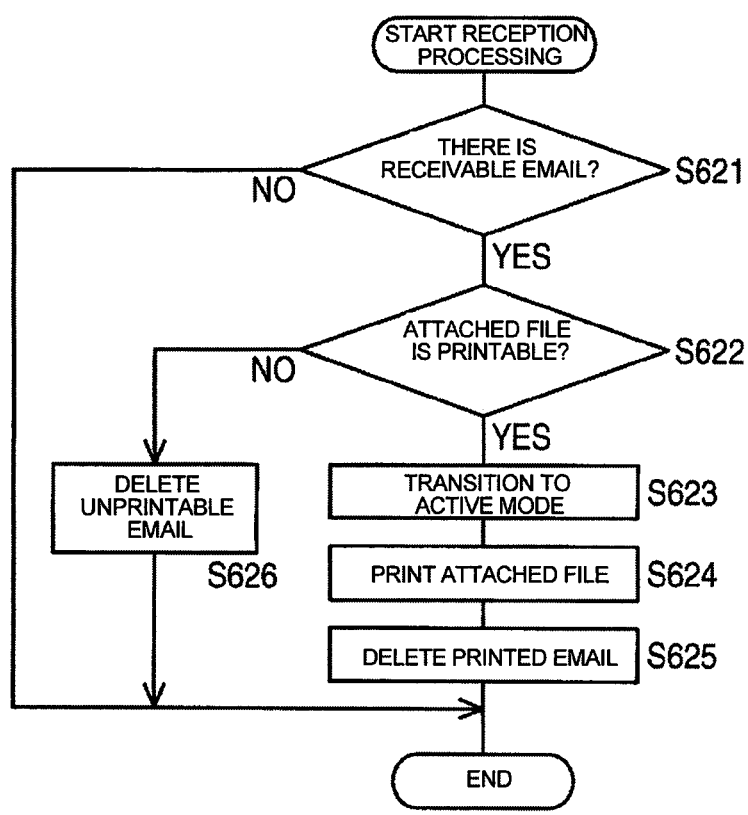
FIG. 13 is a flowchart illustrating a flow of email-reception processing according to the first embodiment.

Next, the email-reception processing performed by the printer is described by referring to FIG. 1. The description is given by following the steps denoted by numbers headed with an S in the flowchart of FIG. 13 illustrating the flow of the email-reception processing according to the first embodiment.

S621: Network controller 202 of printer 3 in the power-saving mode starts the email-reception processing, and starts the communication sequence to connect to mail server 2. When the connection to mail server 2 is established, network controller 202 judges whether there is an unread, receivable email addressed to printer 3 in the email box of mail server 2. If network controller 202 judges that there is no unread, receivable email, network controller 202 terminates the email-reception processing at this time, and waits for the next timing to connect to mail server 2. If, in contrast, network controller judges that there is an unread, receivable email, the processing moves to step S622.

S622: After judging that there is an unread, receivable email, network controller 202 sends a query to mail server 2. On the basis of the email printing condition information stored in email-reception module 403 shown in FIG. 3, network controller 202 judges whether the unread, receivable email is a printable email. If, as a result of the judgment, network controller 202 judges that the unread, receivable email is an unprintable email, the processing moves to step S626. If, in contrast, network controller 202 judges that the unread, receivable email is a printable email, the processing moves to S623 to be performed next.

S623: If network controller 202 judges that the unread, receivable email is a printable email, sub CPU 201 instructs power supply unit 300 to supply power to main unit 100, and thereby makes printer 3 transition to the active mode.

S624: After the transition to the active mode, network controller 202 of printer 3 sends, to mail server 2, a command to acquire the email, and thus receives the email from mail server 2. Then, network controller 202 requests print portion 102 of main unit 100 to print the email. Print portion 102 of main unit 100 prints the file attached to the email received by network controller 202.

S625: When print portion 102 of main unit 100 finishes printing the email, network controller 202 sends, to mail server 2, a command to delete the printed email. Mail server 2 deletes the email from the email box in mail server 2, and then the processing is terminated.

S626: If, in contrast, network controller 202 continues to be in the power-saving mode and judges at step S622 that the unread, receivable email is an unprintable email, network controller 202 sends, to mail server 2, a command to delete the unprintable email. Mail server 2 deletes the email from the email box in mail server 2, and then the processing is terminated. Alternatively, network controller may receive the unread, receivable mail and then send a reply email to the sender to inform the sender of the fact that the file format is not supported. Note that if there are unread, receivable emails addressed to printer 3 in the email box in mail server 2, the processes at steps S622 to S626 are repeatedly performed.

In this way, before receiving emails from the mail server, the printer in the power-saving mode judges whether each of the emails accumulated in the email box in the mail server is printable. So, unnecessary transition from the power-saving mode to the active mode can be avoided. Accordingly, the printer stays in the power-saving mode for a longer time, and the power consumed by the printer can be reduced sufficiently.

As has been described thus far, in the first embodiment, before receiving an email from the mail server, the communication terminal apparatus in the power-saving mode judges whether the email can be processed. So, the occurrence of unnecessary transition from the power-saving mode to the active mode is precluded. Accordingly, the communication terminal apparatus can stay in the power-saving mode for a longer time, and the power consumed by the communication terminal apparatus can be reduced sufficiently.

Second Embodiment

The configuration according to a second embodiment differs from the configuration according to the first embodiment in that the email printing condition information stored in email-reception module 403 shown in FIG. 3 has an additional item: priority. The email printing condition information is described by referring to the explanatory diagram shown in FIG. 14 illustrating the email printing condition information according to the second embodiment. Note that portions that are the same as those in the first embodiment are denoted by the same reference numerals and are not described below.

In FIG. 14, in the email printing condition information, various conditions for a printer to print an email received from a mail serve are set. For example, attached-file extension 501 stores therein "pdf" (portable document format) as the extension of the printable file attached to an email. Maximum email size 502 stores therein "10 MB" (megabytes) as the maximum size (volume) of the printable file attached to an email. Priority 503 stores therein "1" as the priority of a printable email.

The priority means the priority for printing an email. The printer prints an email with a higher priority earlier than an email with a lower priority. In this embodiment, the priority is a value from 1 to 5. The value "1" indicates the highest priority while the value "5" indicates the lowest priority.

The email printing conditions shown in FIG. 14 are not limited to the extension of a file attached to an email, the maximum size of an attached file, and the priority. Various kinds of other information on an email, such as the sender of the email and the subject of the email, can be used as the condition. Note that the mail-server-connection set-up information stored in network-control module 402 shown in FIG. 3 is similar to the mail-server-connection set-up information of the first embodiment shown in FIG. 7.

Now, description is given of operations of the configuration described above. In this embodiment, a description is given of the operations in the case where the printer is in the power-saving mode and two kinds of emails addressed to the printer arrive at the mail server. Note that the processing for the printer to transition to the power-saving mode is similar to that in the first embodiment shown in FIG. 4. Note also that the processing for the printer to transition from the power-saving mode to the active mode is similar to that in the first embodiment shown in FIG. 5. So, no explanation for these processings is given below.

Next, the content of the two kinds of emails received by the printer in this embodiment is described by referring to FIG. 2. The description is given on the basis of the explanatory diagrams shown in FIGS. 15 and 16 illustrating the emails addressed to the printer according to the second embodiment. Note that FIG. 15 illustrates the content of a first email (with the priority "1") while FIG. 16 illustrates the content of a second email (with the priority "3").

In FIG. 15, sender 531 is the email address of PC 1 "pc@example.com." Destination 532 is the email address of printer 3 "printer@example.com." Name of attached file 533 indicates that the name of the attached file is "image.pdf," meaning that the email is attached with a file of the PDF format. Note that some part of image data of the PDF-format file is omitted from the diagram shown in FIG. 15. In addition, priority 534 is "X-Priority: 1," meaning that the email has the highest priority "1."

In FIG. 16, sender 531 is the email address of PC 1 "pc@example.com." Destination 532 is the email address of printer 3 "printer@example.com." Name of attached file 533 indicates that the name of the attached file is "image2.pdf," meaning that the email is attached with a file of the PDF format. Note that some part of image data of the PDF-format file is omitted from the diagram shown in FIG. 16 as well. In addition, priority 534 is "X-Priority: 3," meaning that the email has the priority "3," that is, this email has a lower priority than the email with a priority defined as "X-Priority: 1."

Figure 17:
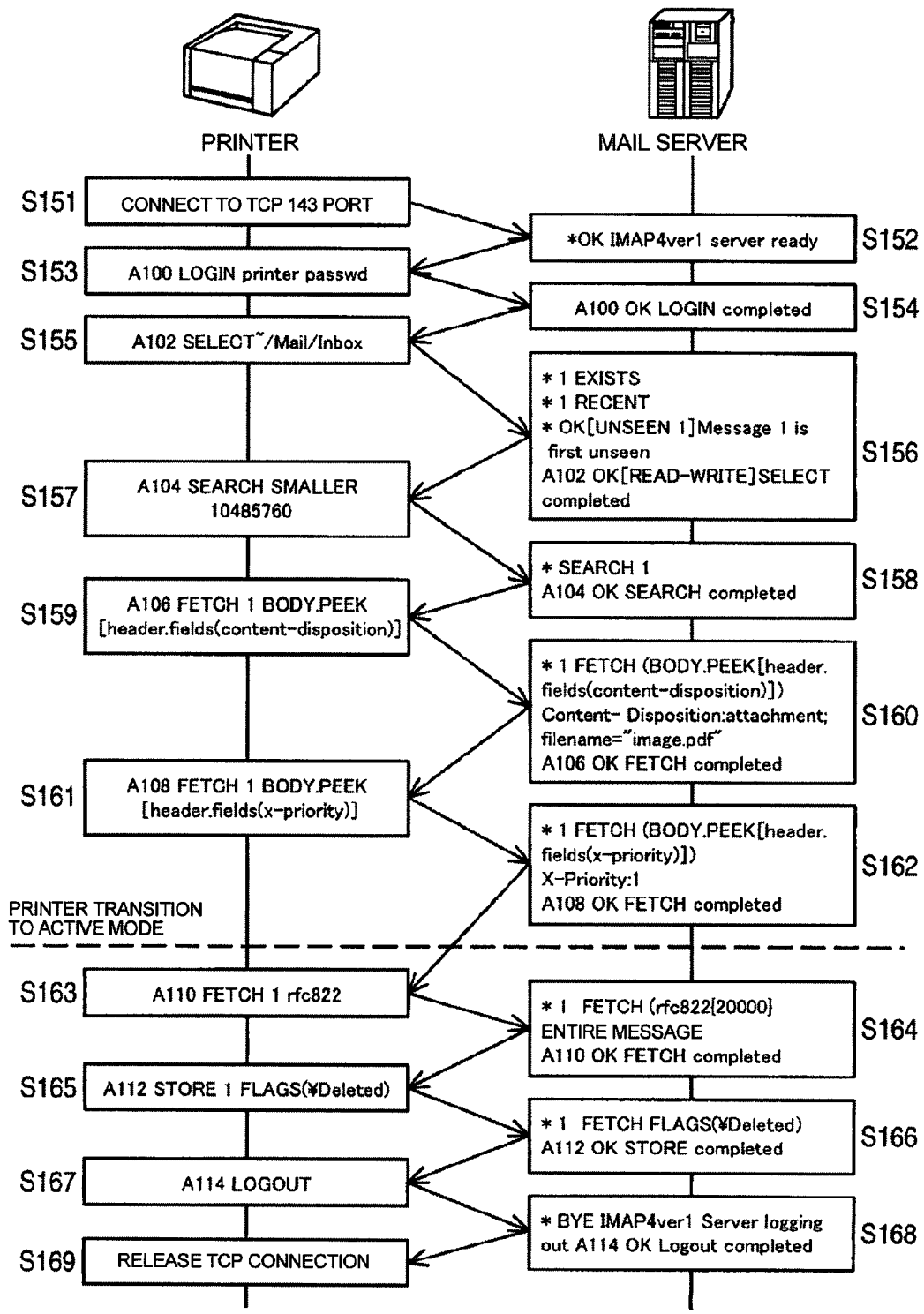
FIG. 17 is a sequence chart illustrating the flow of email-reception processing according to the second embodiment.

Next, by referring to FIGS. 1 and 2, description is given below of the communication sequence performed between the printer and the mail server when the printer in the power-saving mode receives an email from the mail server. The description is given by following the steps denoted by numbers headed with an S in the sequence chart shown in FIG. 17, which illustrates the email-reception processing according to the second embodiment. In this embodiment, the communication protocol between the printer and the mail server is IMAP (Internet Message Access Protocol).

S151 to S155: Similar processes to those performed at steps S51 to S55 in FIG. 10 are performed. So, no description of these steps is given below.

S156: Upon receiving the query from printer 3, mail server 2 replies by sending email information on the email box "~/Mail/Inbox" addressed to printer 3 In this embodiment, the reply contains the fact that the email box has one email ("*1 EXISTS") and the email is unread ("*1 RECENT").

S157: Printer 3 sends an "A104 SEARCH SMALLER 10485760" command to mail server 2 via network controller 202, and thereby searches for emails each with a size that is not larger than 10 MB (10485760 bytes).

S158: Mail server 2 replies by sending, to printer 3, the result of searching for the email that satisfies the conditions set forth by the query of printer 3. In this embodiment, information on email 1 ("*SEARCH 1") is sent to printer 3.

S159: Then, to acquire information on the name of the file attached to email 1 with a size that is not larger than 10 MB, printer 3 sends, via network controller 202, a command that requests the value of the "content-disposition" in the email header.

S160: Mail server 2 replies that the name of the file attached to email 1 is "image.pdf."

S161: Then, to acquire information on the priority of email 1, printer 3 sends, via network controller 202, a command requesting the value of the "X-priority" in the email header.

S162: Mail server 2 replies that the value of the "X-priority" indicating the priority of email 1 is "1."

S163: On the basis of the email printing condition information stored in email-reception module 403 shown in FIG. 3, sub CPU 201 of printer 3 judges that it is possible to receive email 1 because the size of email 1 is not larger than 10 MB, the format of the file attached to email 1 is the PDF-format, and the priority of email 1 is "1" that is not lower than the set-up value. Then, sub CPU 201 performs the transition processing shown in FIG. 5, and printer 3 transitions from the power-saving mode to the active mode. Note that in this embodiment, the set-up value of the priority is "1," but if the set-up value of the priority is "2," sub CPU 201 judges that emails each of which has a priority of either "1" or "2" are receivable.

In this way, on the basis of some of the information acquired by network controller 202 serving as an email-information acquisition unit, sub CPU 201 serving as a judgment unit judges whether there is an email that needs processing in the active mode. Specifically, the information used in the judgment is the information indicating whether there is a file attached to an email, the information on the format of the attached file, the information on the size of the attached file, and the information on the priority for the processing of the email. After the transition from the power-saving mode to the active mode, printer 3 sends, an "A110 FETCH 1 rfc822" command to mail server 2 via network controller 202, and thereby requests mail server 2 to send email 1.

S164: Upon receiving the request for sending email 1, mail server 2 sends email 1 to printer 3.

S165: Upon receiving email 1, printer 3 sends an "A112 STORE 1 FLAGS (\Deleted)" command as a request for deletion of received email 1, to mail server 2 via network controller 202.

S166: Upon receiving the request for deletion of email 1, mail server 2 deletes email 1 from the email box, and sends the result to printer 3.

S167: Having acquired necessary information from mail server 2, printer 3 sends an "A114 LOGOUT" command requesting the log out from mail server 2, to mail server 2 via network controller 202.

S168: Upon receiving the log out request from printer 3, mail server 2 sends a reply of log-out massage to printer 3.

S169: When the log out from mail server 2 is completed, printer 3 releases the TCP connection having been established with mail server 2 via network controller 202.

Figure 18:
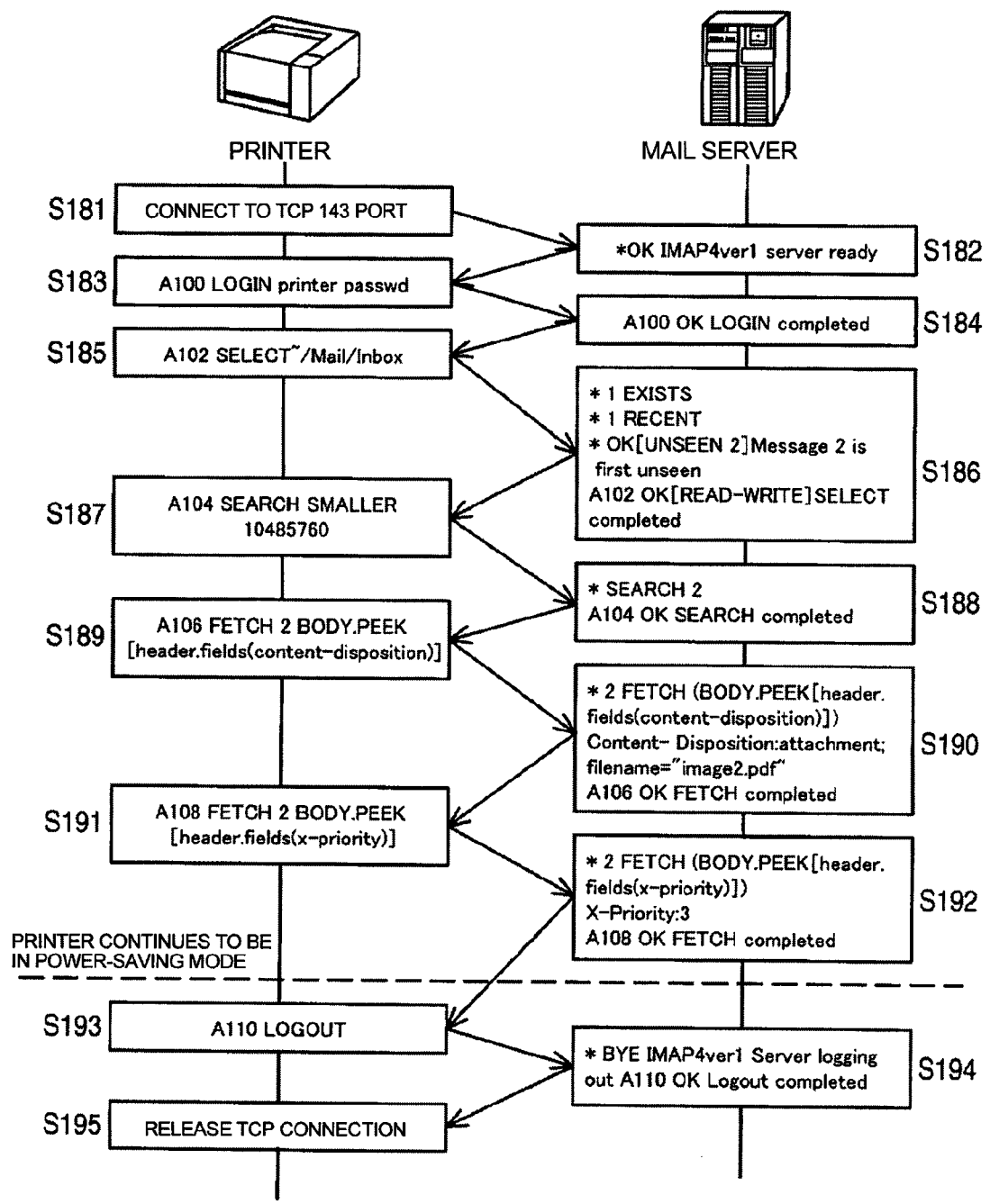
FIG. 18 a sequence chart illustrating the flow of email-reception processing according to the second embodiment.

Next, a description is given of the operations in the case where even if the mail server receives an email addressed to the printer, the printer continues to be in the power-saving instead of transitioning from the power-saving mode to the active mode. To put it differently, by referring to FIGS. 1 and 2, a description is given of the communication sequence between the printer and the mail server for the case where an email with the priority "3" shown in FIG. 16 is received by the mail server. The description is given by following the steps denoted by numbers headed with an S in the sequence chart shown in FIG. 18, which illustrates the flow of email-reception processing according to the second embodiment. Note that, in this embodiment, the communication protocol used between the printer and the mail server is IMAP.

S181 to S185: Similar processes to those at steps S51 to S55 in FIG. 10 are performed. So, no description of steps S181 to 185 is given below.

S186: upon receiving the query from printer 3, mail server 2 replies by sending email information on the email box "~/Mail/Inbox" addressed to printer 3. In this embodiment, mail server 2 replies that there is one email in the email box ("*1 EXISTS") and the email is unread ("*1 RECENT").

S187: Printer 3 sends an "A104 SEARCH SMALLER 10485760" command to mail server 2 via network controller 202, and thereby searches for emails each with a size that is not larger than 10 MB (10485760 bytes).

S188: Mail server 2 replies by sending, to printer 3, the result of searching for the emails that satisfy the conditions set forth by the query of printer 3. In this embodiment, information on email 2 ("*SEARCH 2") is sent to printer 3.

S189: Then, to acquire information on the name of the file attached to email 2 of the emails each with a size that is not larger than 10 MB, printer 3 sends, via network controller 202, a command that requests the value of the "content-disposition" in the email header.

S190: Mail server 2 replies that the name of the file attached to email 2 is "Image2.pdf."

S191: Then, to acquire the information on the priority of email 2, printer 3 sends, via network controller 202, a command requesting the value of "X-Priority" in the email header.

S192: Mail server 2 replies that the value of "X-Priority" indicating the priority of email 2 is "3."

On the basis of the email printing condition information stored in email-reception module 403 shown in FIG. 3, printer 3 judges that email 2 is unreceivable. This is because although email 2 has a size that is not larger than 10 MB and the format of the file attached to email 2 is the PDF-format, email 2 has a priority "3" that is lower than the set-up value "1." Then, printer 3 continues to be in the power-saving mode without transitioning from the power-saving mode to the active mode. In addition, as email 2 has a priority "3" which is lower than the set-up value "1," printer 3 replies by sending an email indicating that email 2 is unprintable.

S193: Having acquired necessary information from mail server 2, printer 3 sends an "A110 LOGOUT" command requesting the log out from mail server 2 to mail server 2 via network controller 202.

S194: Upon receiving, from printer 3, the request for the log out, mail server 2 replies by sending a log-out message to printer 3.

S195: When the log out from mail server 2 is finished, printer 3 releases the TCP connection having been established with mail server 2 via network controller 292.

In this way, before receiving emails from the mail server, the printer in the power-saving mode judges whether each of the emails accumulated in the email box in the mail server has a priority that is lower than the priority set up in advance. If the priority of an email is lower than the set-up value, the printer judges that the print processing for the email is not necessary. So, unnecessary transition from the power-saving mode to the active mode can be avoided. Accordingly, the printer can continue to be in the power-saving mode for a longer time, and the power consumed by the printer can be reduced sufficiently.

As has been described thus far, according to the second embodiment, before receiving emails from the mail server, the printer in the power-saving mode judges whether each of the emails accumulated in the email box in the mail server has a priority that is lower than the priority set up in advance. If the email has a priority that is lower than the priority set up in advance, the printer judges that the print processing for the email is not necessary. So, unnecessary transition from the power-saving mode to the active mode is not performed. Accordingly, the printer stays in the power-saving mode for a longer time than in the first embodiment, and can sufficiently reduce the power consumed by the printer.

Note that the description of the first and the second embodiments assumes that the communication terminal apparatus is a printer, but the communication terminal apparatus is not limited to a printer. For example, the communication terminal apparatus may be a photocopier, a multi-function printer, or a fax machine.

In addition, because the description of the first and the second embodiments assumes that the communication terminal apparatus is a printer, the operations to print a received email are described as an example. The operation, however, is not limited thereto. Alternatively, the communication terminal apparatus may be a fax machine, and the operation to be described may be the operations to send a fax of the received email. Furthermore, the communication terminal apparatus may be a file server or the like on the communication lines, and the operations to be described may be the operations to store emails in a storage unit, such as a storage device, connected to the communication terminal apparatus.

The invention claimed is:

1. A communication apparatus capable of communicating with a mail server and having a normal active mode and a power-saving mode that is lower in power consumption than the active mode, the communication apparatus comprising:
    an email-information acquisition unit configured to acquire information on a file that is attached to an email, received by the mail server, from the mail server in the power-saving mode;
    a judgment unit configured to perform a judgment of the attached file is processable, on the basis of the information on the attached file acquired by the email-information acquisition unit;
    a power-saving mode cancelling unit configured to carry out a transition from the power-saving mode to the active mode when the judgment unit judges that the attached file is processable; and
    an email acquisition unit configured to acquire an email, received by the mail server, from the mail server in the active mode,
    wherein the email-information acquisition unit is configured to send a sender of the email a reply mail informing that the email is of a file format not supported by the process unit when the judgment unit judges that the email is not processable by the communication apparatus.

2. The communication apparatus according to claim 1, wherein the judgment unit is configured to perform the judgment on the basis of information indicating whether there is a file attached to the email, from the information acquired by the email-information acquisition unit.

3. The communication apparatus according to claim 1, wherein the judgment unit is configured to perform the judgment on the basis of information indicating a format of a file attached to the email, from the information acquired by the email-information acquisition unit.

4. The communication apparatus according to claim 1, wherein the judgment unit is configured to perform the judgment on the basis of information on a priority for processing the email, from the information acquired by the email-information acquisition unit.

5. The communication apparatus according to claim 1, further comprising a process unit adapted to receive no power in the power-saving mode, and to receive power in the active mode, wherein the process unit is configured to process the email in the active mode.

6. The communication apparatus according to claim 5, wherein the process unit comprises a print portion configured to make a print on a medium.

7. The communication apparatus according to claim 5, wherein the process unit comprises a facsimile portion configured to send a facsimile.

8. The communication apparatus according to claim 5, wherein the process unit is configured to store the email in a storage device inside or outside the communication apparatus.

9. The communication apparatus according to claim 5, wherein the email acquisition unit comprises the email-information acquisition unit.

10. The communication apparatus according to claim 1, further comprising:
a power supply unit;
a main unit receiving power from the power supply unit in the normal active mode and receiving no power from the power supply unit in the power-saving mode; and
a sub unit receiving power from the power supply unit in the normal active mode and the power-saving mode.

11. The communication apparatus according to claim 5 further comprising:
a power supply unit;
a main unit comprising the process unit, wherein the main unit is configured to receive no power from the power supply unit in the power-saving mode, and to receive power from the power supply unit in the active mode; and
a sub unit comprising the email-information acquisition unit, the judgment unit, and a power-saving mode cancelling unit, wherein the sub unit is configured to receive power from the power supply unit in both the normal active mode and the power-saving mode.

12. The communication apparatus according to claim 10, wherein the sub unit is configured to send the mail server a command to delete the email from the mail server when the judgment unit judges that the email is not processable by the communication apparatus.

13. The communication apparatus according to claim 11, wherein the sub unit is configured to instruct the power supply unit to make the main unit transition from one of the active mode to the power-saving mode, and the power-saving mode to the active mode.

14. The communication apparatus according to claim 11, wherein
the main unit comprises a print portion serving as the process unit, and
the main unit is configured to make the print portion print a file attached to an email that is judged to be processable by the print portion serving as the process unit, when the transition is made from the power-saving mode to the active mode.

15. A communication apparatus capable of communicating with a mail server and having a normal active mode and a power-saving mode that is lower in power consumption than the active mode, the communication apparatus comprising:
a power supply unit;
a main unit configured to receive power from the power supply unit in the active mode and receive no power from the power supply unit in the power-saving mode; and
a sub unit configured to receive power from the power supply unit in both the normal active mode and the power-saving mode, wherein
the sub unit comprises
a network controller configured to receive an email, received by the mail server, from the mail server in the active mode, and acquire information on a file attached to an email, received by the mail server, from the mail server in the power-saving mode, and
a sub controller configured to judge, in the power-saving mode, whether the attached file is processable on the basis of the information on the attached file acquired by the network controller, and configured to make the communication apparatus transition from the power-saving mode to the active mode when judging that there is an email that needs processing by the process unit in the active mode,
wherein the network controller is configured to receive, from the mail server, the email having the file attached thereto that is determined to be processable when the communication apparatus transits from the power-saving mode to the active mode,
wherein the network controller is configured to send, to a sender of the email, a reply mail informing that a file format of the email is not supported by the process unit when that the email is judged to be not processable by the process unit.

16. The communication apparatus according to claim 15, wherein the network controller is configured to send a command to the mail server to delete the email from the mail server when the email is judged to be not processable by the process unit.

17. The communication apparatus according to claim 15, wherein
the main unit includes a main controller and a print portion serving as the process unit, and
the main controller is configured to make the print portion print a file attached to an email judged to be processable by the print portion serving as the process unit when the power-saving mode is cancelled and transition is made to the active mode.

18. A communication apparatus capable of communicating with a mail server and having a normal active mode and a power-saving mode that is lower in power consumption than the active mode, the communication apparatus comprising:
an email-information acquisition unit configured to acquire information on an email, received by the mail server, from the mail server in the power-saving mode;
a judgment unit configured to perform a judgment of whether there is an email that needs processing in the active mode, on the basis of the information acquired by the email-information acquisition unit;
a power-saving mode cancelling unit configured to carry out a transition from the power-saving mode to the active mode when the judgment unit judges that the mail server has an email that needs processing in the active mode; and
an email acquisition unit configured to acquire an email, received by the mail server, from the mail server in the active mode,
wherein the judgment unit is configured to perform the judgment on the basis of information indicating a size of a file attached to the email, from the information acquired by the email-information acquisition unit,
wherein the email-information acquisition unit is configured to send a sender of the email a reply mail informing that the email is of a file format not supported by the process unit when the judgment unit judges that the email is not processable by the communication apparatus.

* * * * *